March 28, 1950 C. E. FRANKLIN 2,502,040
TREE HOLDER
Filed Oct. 29, 1948 2 Sheets-Sheet 1

INVENTOR.
CURTIS E. FRANKLIN
BY
ATTORNEYS

March 28, 1950  C. E. FRANKLIN  2,502,040
TREE HOLDER

Filed Oct. 29, 1948  2 Sheets-Sheet 2

INVENTOR.
CURTIS E. FRANKLIN
BY
ATTORNEYS

Patented Mar. 28, 1950

2,502,040

UNITED STATES PATENT OFFICE 2,502,040

TREE HOLDER

Curtis E. Franklin, Avenal, Calif.

Application October 29, 1948, Serial No. 57,174

7 Claims. (Cl. 248—44)

This invention relates to stands or pedestals and more particularly to tree holders adapted to hold hewn or cut trees such as Christmas trees or other ornamental trees, shrubs and the like in an erect position.

Tree holders have been previously manufactured and sold which are adapted to hold Christmas trees in an erect position but many of such conventional tree holders are constructed in such a manner that the tree held thereby is supported at an undesirable elevation because of the needlessly thickened base portions of such holders. The conventional tree holders are objectionable in that the trunk of the tree is engaged by the holder at a location at an appreciable height above the lower end of the tree trunk requiring the removal of many branches of the tree to attach the trunk of the tree in the holder. Such holders are conspicuous and are difficult to conceal, do not readily accommodate trees and the like of varied trunk sizes, and generally do not provide dependable tree support. Further, they are usually difficult to install and unnecessarily complex and expensive.

In view of the disadvantages of the conventional type tree holder, it is one object of the present invention to provide a tree holder in which the trunk of the tree or the like is supported close to the floor or other supporting medium on which the tree holder is rested.

Another object of the present invention is to provide a holder adapted to clamp the trunk of a tree or the like at a relatively low position, whereby it is unnecessary to cut many of the lower branches from the tree, yet adapted to effect dependable support.

Another object is to provide an inconspicuous, easily concealed pedestal of the type described.

Another object is to provide a simple and economical Christmas tree stand.

Another object is to provide a tree holder in which the approximately erect positioning of the tree in the holder may be easily adjusted.

Other objects and advantages of the present invention will become apparent in the following description taken in connection with the accompanying drawings in which.

Figure 1:
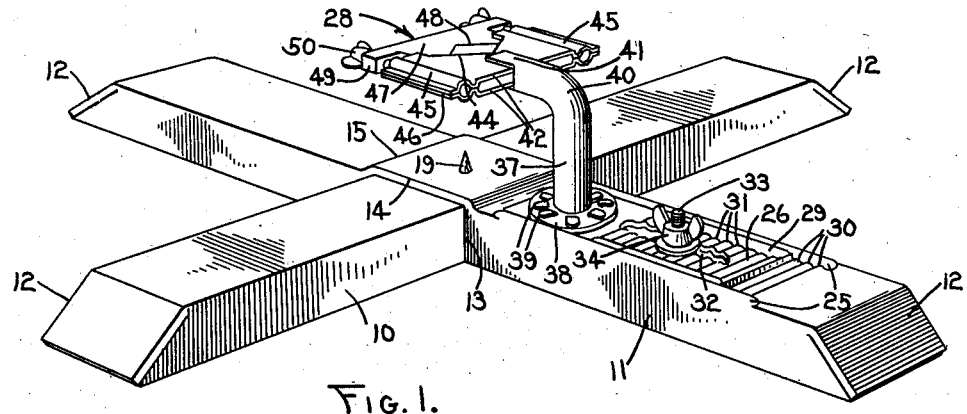
Fig. 1 is a perspective view of a tree holder illustrating the construction and principles of the present invention.
Figure 2:
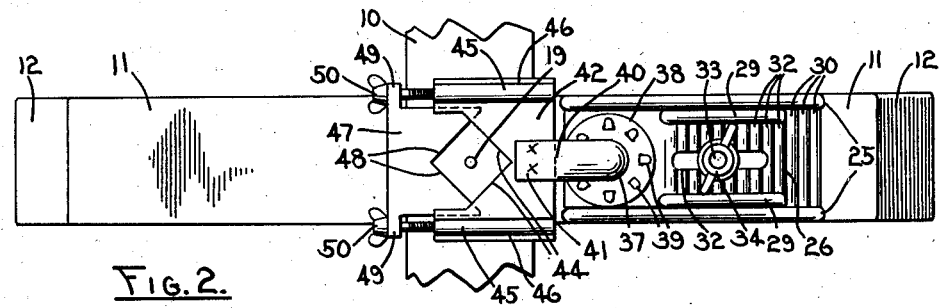
Fig. 2 is a fragmentary plan view of the tree holder shown in Fig. 1.
Figure 3:
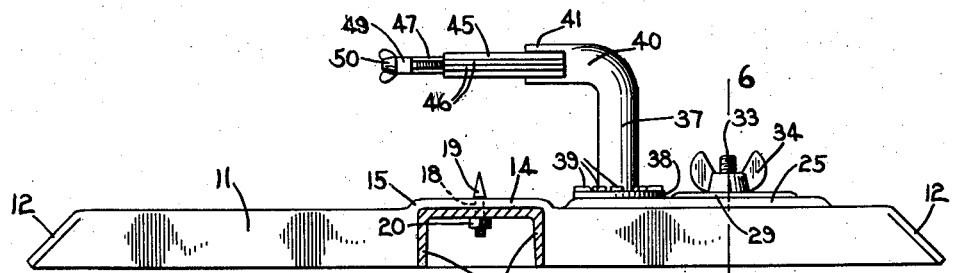
Fig. 3 is a side elevational view of the tree holder showing one of the legs thereof in vertical transverse section.
Figure 4:
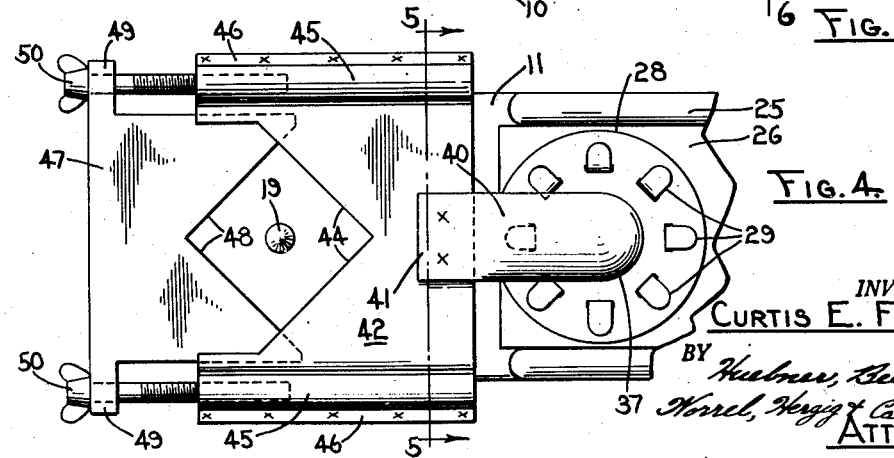
Fig. 4 is a fragmentary plan view of the tree holder illustrating the construction of the clamping device thereof.

Referring to the drawings and particularly to the construction as shown in Figs. 1 to 6, inclusive, which illustrates a first form of the invention, the tree holder comprises a base portion which consists of a pair of channel members 10 and 11 located in crossed relation at substantially right angles to each other. Each of the angle members 10 and 11 is located with the web thereof in an upward position and the parallel legs thereof extending downwardly for a more pleasing appearance. The outer ends of each of the angle members 10 and 11 are beveled outwardly and downwardly as indicated by the reference numeral 12, lending a finished appearance to the tree holder legs and adding to the holder's utility. The leg portions of one of the angle members 11 are cut away near the central portion 13 thereof and the interconnecting central web portion 14 thereof is stamped upwardly, as indicated by the reference numeral 15, whereby the channel member 10 may be located at right angles through the channel member 11 with the entire length of the downwardly extending leg portions of each of the channel members being flush and adapted to make continuous contact with a floor or other supporting surface. With the channel members 10 and 11 thus assembled in right angular relation, a plurality of radially extending feet are provided adapted to maintain the tree holder in a horizontal position on a floor, table or like supporting surface.

Means is provided for maintaining the channel members 10 and 11 in assembled relation by providing a threaded bolt 18 which extends downwardly through aligned openings formed through the central web portions of both of the angle members 10 and 11 with a nut 20 screwed onto the lower end of the bolt 18 maintaining the angle members 10 and 11 in assembled relation. This construction is clearly evident in Fig. 3. Snug fitting of the crossed channel members 10 and 11 further facilitates snug fitting. The head of the bolt 18 is formed to a conical shape forming a pointed projection 19 whereby the trunk of a Christmas tree, or other tree, shrub, or other object to be held in an erect position may be forced downwardly onto the pointed projection 19 of the bolt 18, thus definitely locating the lower end thereof in relation to the base of the holder.

Means is provided for engaging the trunk of the tree at a location upwardly of the lower end thereof by providing elongated, longitudinal, parallel upwardly embossed portions 25 along the upper outer edges of the channel member 11 at one side of the channel member 10. These upwardly embossed portions 25 are adapted to guide a plate 26 therebetween in movement longitudinally of the member 11, which plate supports an upwardly located tree clamp indicated generally by the reference numeral 28. The upper surface of the channel member 11 between the embossed portions 25 is transversely corrugated at 30 and the plate 26 is similarly transversely corrugated at 31. The longitudinal parallel side edges of the plate 26 are embossed upwardly at 29 thereby stiffening the plate longitudinally. The plate 26 is adjustably positioned longitudinally of the angle member 11 with the corrugated portions 30 and 31 in nesting relation and means is provided for maintaining the plate 26 and the clamp 28 supported thereon in predetermined position. This is accomplished by providing a slot 32 formed longitudinally of the plate 26 with a bolt 33 extending upwardly through the web portion of the channel 11 and also upwardly through the slot 32 with a wing nut 34 threadably received on the upper end of the bolt and adapted to be turned downwardly tightly against the upper side of the plate 26 thereby maintaining the selected relative positions of the plate 26 and the clamp 28 supported thereon.

Figure 5:
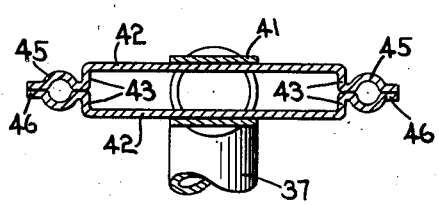
Fig. 5 is a vertical sectional view through the clamping portion of the tree holder, taken along line 5—5 in Fig. 4.
Figure 6:
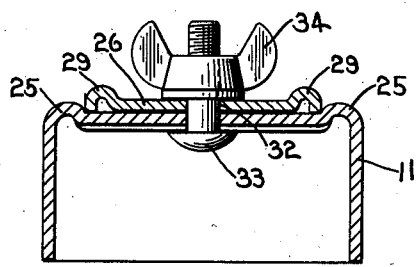
Fig. 6 is a transverse vertical sectional view through one of the legs of the tree holder showing the adjustable plate attached thereto on which the clamping means for the tree is secured, as viewed from line 6—6 in Fig. 3.

The clamping member 28 is supported on the inner end of the plate 26 by providing a pedestal 37 which has an annular flange 38 formed integral therewith at its lower end. The flange 38 is provided with a plurality of annularly located and circumferentially spaced openings and a like plurality of fingers 39 are pierced from the face of the plate 26, are extended upwardly through the openings in the flange 38, and are bent horizontally outwardly thus maintaining the flange and pedestal in assembled relation to the plate 26 in a dependable, simple, and inexpensive manner. The upper end of the pedestal 37 is provided with an integral, horizontally and inwardly extending portion 40 which is horizontally bifurcated at 41 at its inner end. A pair of horizontally extending and superimposed parallel plates 42 as shown in Fig. 5, providing a stationary jaw of the clamping means 28, are located between the bifurcated portions 41 of the pedestal 37 and are securely attached thereto, as by welding, riveting, bolting or the like. The plates 42 are similarly shaped and are arranged in facing relation. The plates have substantially parallel, spaced central portions, side walls inwardly extended and in combination with the central portions define a slide receptacle therebetween. The inwardly extended edges of the spaced plates 42 are provided with a V-shaped, or other desired shaped, recess 44 adapted to receive one side of the trunk of a tree or other object to be supported in the holder. The plates 42 are outwardly extended in abutting relation, providing fixed spacing of the plates and are oppositely arched at 45 to define substantially parallel screw-threaded sockets at opposite edges of the plates 42. Abutting lips 46 outwardly extended from the sockets further provide dependable association of the plates and may be weldably secured to join the plates 42 in unitary relation if desired. The formation of the stationary portion of the clamping means 28, as described, is simple and economical in that each plate is adapted to stamping formation including the screw threads within the sockets 45. The space between the plates 42 is adapted slidably to receive a movable jaw 47 therein having a V-shaped, or other, complementary recess 48 adapted to engage the opposite side of the trunk of the tree or other article supported in the holder. The movably jaw 47 is provided with oppositely extending ears 49 and thumb screws 50 are rotatably received through the ears in the clamp 47 and are threadably received in the screw-threaded sockets 45 whereby the clamp 47 may be forced towards the fixed jaw formed of the plates 42 thereby clamping the trunk of the tree therebetween.

*Operation*

In the use of the tree holder as shown and described, the plate 26 is adjusted longitudinally of the channel member 11 and secured in position by tightening of the wing nut 34. The trunk of the tree is thereafter inserted between the jaw 47 and the spaced plates 42 with the lower end thereof forced downwardly onto the pointed projection 19 of the bolt 18. The thumb screws 50 are thereafter turned inwardly tightly constricting the clamp 28 about the trunk of the tree, or other supported object, with the V-shaped recess 44 formed in the space plates 42 engaging the opposite side of the trunk of the tree, whereby the tree is held vertically by engagement at the lower end thereof with the pointed projection 19 and by being held upwardly therefrom by the clamp 28. The vertical angularity of the tree is thereafter adjusted by loosening the wing nut 34 and moving the plate 26 longitudinally to a position achieving the desired tree positioning. The wing nut 34 is thereafter tightened downwardly on the bolt 33 against the top surface of the plate 26, thus securing the tree in the desired vertical position.

*Second form*

Figure 7:
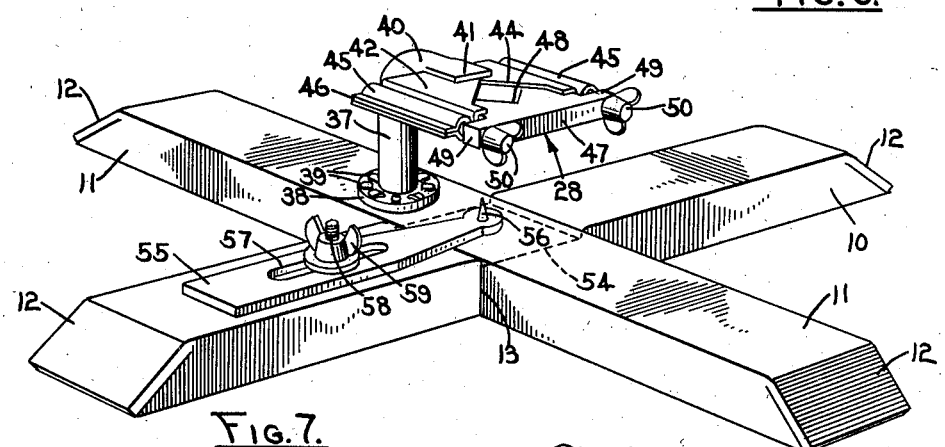
Fig. 7 is a perspective view of a second form of the invention.
Figure 8:
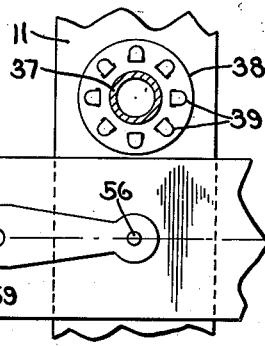
Fig. 8 is a fragmentary plan view of the second form of the tree holder.
Figure 9:
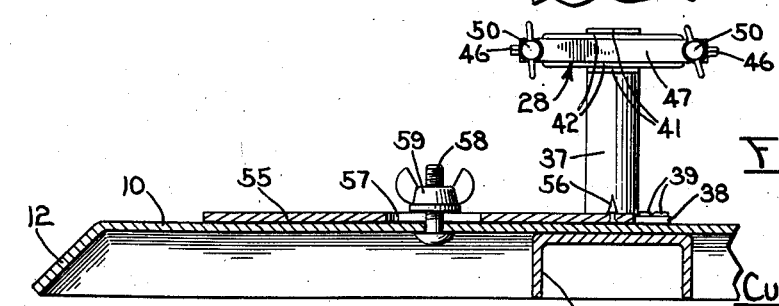
Fig. 9 is a fragmentary vertical sectional view through the second form of the tree holder, taken along line 9—9 in Fig. 8.

A second form of the tree holder is illustrated in Figs. 7, 8, and 9 which is similar to the first form of the invention. In the second form of the present invention the channel members 10 and 11 are again employed and identified with the same numbers in the drawing. The downwardly extended legs of the angle members 10 and 11 both are removed near the central portions thereof. The channel member 10 is formed with a square, central, depressed portion 54 and the members 10 and 11 arranged in crossed relation, as before, but with the web of the member 11 received in the square depressed portion 54 of the web of the member 10 whereby an upper uninterrupted flat surface is provided at the intersection of the members 10 and 11.

A bar 55 is located against the upper side and longitudinally of one of the channel members and is provided with a pointed upwardly extended projection 56 which is located substantially medially of the juxtaposed portions of the channels 10 and 11 and of the crossed members and is adapted to receive the lower end of the trunk of a tree or the like thereover. This pointed projection 56 is adapted to be adjustably positioned relative to the tree clamp 28 located thereabove by providing a slot longitudinally through the bar 55. A bolt 58 extends upwardly through an opening in the channel member 10 and also upwardly through the slot 57. A wing nut 59 is threadedly received on the upper end of the bolt 58 whereby the adjustability of the pointed projection 56 may be maintained by tightening the bar 55 in adjusted position against the channel member on which it is mounted.

In the second form of the invention, the adjustable positioning of the projection 56 eliminates the need for adjustable positioning of the clamp 28. The clamp 28 is formed as previously described and thus is not further described at this point, elements of the clamp in Figs. 7 and 9 being numbered to correspond with the same elements in the previous figures. Inasmuch as the clamp does not need to be adjustably positioned the need for the bosses 25 and the corrugations 30 are dispensed with. Further, it is not necessary to employ an adjustably positioned plate 26. Instead the pedestal 37 is mounted directly on the member 11 by means of the flange 38 and the fingers 39 pierced from the member 11, extended upwardly through the flange, and bent back upon the flange to maintain the same in position.

*Operation of second form*

The operation of the second form of the invention is very similar to the operation of the first form but with the tree clamp 28 immovably secured to one of the channel members 11 of the base portion 53 and the pointed projection 56 adjustable horizontally relative thereto. With the wing nut 59 loosened on the bolt 58, the bar 55 may be slid in any horizontal direction on the upper surface of the channel member 10 and pivoted on the bolt 58 whereby the pointed projection 56 may be moved to the desired position to regulate the positioning of the tree thereon. After the tree has been adjusted to the desired vertical position, the wing nut 59 is thereafter turned downwardly tightly against the bar 55 thereby maintaining the predetermined position of the bar and pointed projection 56 and maintaining the tree in the desired erect position.

From the foregoing description, it will be seen that a holder for Christmas trees, shrubs, and other objects has been devised which provides support in a compact manner and does not elevate the object supported excessively above a supporting surface. The clamp 28 is located only a short distance above the upper surface of the crossed members and projection 19 or 56 on which the tree is supported and thus any necessity for excessive trimming of the lower branches of a tree is obviated. This further adapts the holder of the present invention for easy concealment thereof and avoids the conspicuous character of conventional tree holders. Both forms of the invention provide adjustable, relative positioning, of the centering projection 19 or 56 relative to the clamp 28. This permits the holder of the present invention readily to be adapted to inclined supporting surfaces and still to maintain the object held in a desired erect or leaned position. Invention is believed to reside in the means for achieving this adjustability in a simple and inexpensive manner yet achieving dependable object support. The devices of the present invention are simple in structure, dependable in operation, and economical to produce.

Although I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent devices and apparatus.

Having described my invention what I claim as new and desire to secure by Letters Patent is:

1. A tree holder comprising a plurality of horizontally radially extending feet members, a pointed projection extending upwardly from a medial portion of the radially extending feet members and borne thereby, a tree clamp having a stationary jaw supported on one of the radially extending feet members, a jaw movable relative to the stationary jaw mounted on the stationary jaw for constrictive movement relative thereto, and means for adjusting the relative horizontal positioning of the pointed projection and of the stationary jaw.

2. A tree holder comprising a pair of joined, horizontally located, right angularly crossed members, a pointed projection extended upwardly from substantially a medial portion of the crossed members, a fixed jaw supported on one of the crossed members at a location above the pointed projection, a movable jaw, means slideably mounting the movable jaw on the fixed jaw, said means being adapted forceably to constrict the jaws, and means for moving the fixed jaw longitudinally of the member on which it is mounted.

3. A tree holder comprising a pair of inverted channel members secured in substantially right angular, crossed relationship with the bottom sides thereof flush, an upwardly extending pointed projection located medially of the crossed portions of the channel members, an elongated plate longitudinally positioned and mounted for longitudinal movement on one of the channel members at one side of the other channel member, a pedestal secured to the inner end of the plate and extended upwardly therefrom with a stationary jaw attached in a horizontal position to the upper end of the pedestal at a location above the pointed projection, a movable jaw horizontally slideable on the stationary jaw, and means for forcing the movable jaw toward the stationary jaw, the jaws being adapted to receive a trunk of a tree therebetween.

4. A tree holder comprising a pair of horizontally located substantially right angularly crossed channel members securely attached to each other in an inverted position with the lower sides thereof being flush, providing a plurality of radially horizontally extending feet members, a pedestal mounted on one of the channel members at one side of the crossed portion of the channel members and extended upwardly therefrom, a horizontally located stationary jaw securely attached to the upper end of the pedestal and having a V-shaped recess located above the crossed portion of the channel members, a moveable jaw horizontally slideable toward and away from the stationary jaw having a horizontally inwardly directed V-shaped recess similar to the V-shaped recess of the stationary jaw, means for forcing the moveable jaw toward the stationary jaw, a bar horizontally adjustably attached to the upper side of a channel member having a portion extending medially of the crossed portion of said channel members, and a pointed projection attached to the bar and extended upwardly therefrom at a location substantially medially of the crossed portions of the channel members.

5. A tree holder comprising a pair of horizontally located inverted channel members secured together in substantially right angular crossed relationship with the lower sides thereof being flush, a pointed projection secured to and extended upwardly from a medial portion of the crossed portions of the channel members, a plate located on one of the channel members, means on the channel member for guiding the plate longitudinally thereof, means for adjustably maintaining the plate in longitudinally adjusted position on the channel member, a pedestal secured to the inner end of the plate and extended upwardly therefrom having a horizontally extended portion at the upper end thereof, a pair of horizontally extending vertically spaced parallel plates attached to the horizontally extending portion of the pedestal each having an edgewardly directed V-shaped recess formed therein thus forming a fixed jaw of a clamp member, a moveable jaw slideable between the spaced plates of the fixed jaw having an edgewardly directed V-shaped recess formed therein adjacent and facing the V-shaped recess of the stationary jaw, and means for forcing the moveable jaw toward the stationary jaw.

6. A tree holder comprising a pair of inverted channel members secured together in substantially right angular crossed relationship with the lower sides and the upper sides thereof being flush, a pedestal secured to one of the channel members at one side of the crossed portion of the channel members and extended upwardly therefrom having a horizontally inwardly extending portion at the upper end thereof, a stationary jaw secured to the upper end of the pedestal in a horizontal position having an inwardly directed V-shaped recess, a jaw horizontally moveable toward and away from the stationary jaw having an inwardly directed V-shaped recess formed therein, means for forcing the moveable jaw toward the stationary jaw adapted to receive the trunk of a tree therebetween, a horizontally extending bar located on one portion of one of the channel members at one side of the other channel member and extending substantially longitudinally thereof with a portion thereof extending to a position substantially medially of the crossed portions of the channel member, a pointed projection secured to and extending upwardly from the medially located portion of the bar, said bar having a slot formed longitudinally therein, a bolt extending upwardly from the channel portion on which the bar is supported and also upwardly through the slot formed through the bar with a wing nut threadedly received on the upper end thereof adapted to be tightened to hold the bar in adjusted horizontal positions.

7. A tree holder comprising a base having a medial portion, a pointed projection mounted in upwardly extended position on the medial portion of the base, a tree clamp having a stationary jaw supported on the base in elevationally spaced relation to the medial portion thereof and a jaw movably mounted on the stationary jaw for constrictive operation therewith, and means for adjusting the relative horizontal positioning of the pointed projection and the stationary jaw of the tree clamp.

CURTIS E. FRANKLIN.

REFERENCES CITED

The following references are of record in the file of this patent:

UNITED STATES PATENTS

| Number | Name | Date |
|---|---|---|
| 848,850 | Pissahl | Apr. 2, 1907 |
| 1,463,734 | Ullrich | July 31, 1923 |
| 1,873,693 | Whitfield et al. | Aug. 23, 1932 |
| 2,029,281 | McCann | Jan. 28, 1936 |
| 2,464,593 | Lorentzen | Mar. 15, 1949 |